United States Patent [19]

Sinclair et al.

[11] Patent Number: 4,698,415

[45] Date of Patent: Oct. 6, 1987

[54] METHOD FOR THE PREPARATION OF POLYARYLENE SULFIDE WITH AQUEOUS POLYETHYLENE GLYCOL MIXTURE

[75] Inventors: Richard G. Sinclair; Herman P. Benecke; Sylvester Sowell, all of Columbus, Ohio

[73] Assignee: Idemitsu Petrochemical Co., Ltd., Tokyo, Japan

[21] Appl. No.: 861,622

[22] Filed: May 6, 1986

Related U.S. Application Data

[63] Continuation-in-part of Ser. No. 682,798, Dec. 18, 1984, abandoned.

[51] Int. Cl.⁴ .............................................. C08G 75/14
[52] U.S. Cl. ...................................... 528/388; 528/86; 528/220; 528/222; 528/226
[58] Field of Search ................. 528/388, 86, 220, 226, 528/222

[56] References Cited

U.S. PATENT DOCUMENTS 4,490,522  12/1984  Kawabata et al. .................. 528/388
4,495,332   1/1985  Shiiki et al. ......................... 528/388

Primary Examiner—Harold D. Anderson
Attorney, Agent, or Firm—Frishauf, Holtz, Goodman & Woodward

[57] ABSTRACT

The invention provides a novel efficient method for the preparation of a polyarylene sulfide or, typically, polyphenylene sulfide by the reaction of an alkali metal sulfide, e.g. $Na_2S$, and a polyhalogenated aromatic compound, e.g. 1,4-dichlorobenzene. The improvement in the inventive method comprises performing the reaction in a heterogeneous reaction mixture comprising water and a polyethyleneglycol having a relatively high molecular weight, namely an average molecular weight of from 2,000 to 20,000, and not freely miscible with water. The product polymer is outstandingly free from salt impurities, e.g. sodium chloride, as a byproduct of the reaction. When a low molecular polyethyleneglycol is added to the reaction mixture in combination with the above mentioned high molecular polyethyleneglycol, a remarkable catalytic effect is obtained to accelerate the reaction and increase the yield of the desired polymer product.

18 Claims, No Drawings

METHOD FOR THE PREPARATION OF POLYARYLENE SULFIDE WITH AQUEOUS POLYETHYLENE GLYCOL MIXTURE

This application is a continuation-in-part of application Ser. No. 682,798, filed Dec. 18, 1984, now abandoned.

BACKGROUND OF THE INVENTION

The present invention relates to a method for the preparation of a polyarylene sulfide or, more particularly, to a method for the preparation of a polyphenylene sulfide having an outstandingly small content of salt in a process by which the polymer product can readily be separated from the reaction mixture.

Polyarylene sulfide or, typically, polyphenylene sulfide, which is referred to as PPS hereinbelow, is a partially heat-curable thermoplastic resin having excellent characteristic properties as a so-called engineering plastic in respect of the remarkable resistance against various chemicals, good mechanical properties retained over a wide range of temperature, heat-resistant rigidity and others.

PPS is usually prepared, as is described in Japanese Patent Publication No.52-12240, by the reaction of 1,4-dichlorobenzene and sodium sulfide in an organic amide as the solvent in the presence of a metal carboxylate as the catalyst. This method is, however, disadvantageous due to the high production cost of the PPS because the amount of the relatively expensive metal carboxylate required for sufficiently accelerating the reaction is very large in the range, for example, from 0.7 to 4 moles per mole of the sodium sulfide. Moreover, the PPS product unavoidably contains as much as 1000 to 3000 ppm of sodium chloride as an impurity produced by the reaction as a byproduct. Such a high content of the sodium chloride impurity is of course detrimental in the PPS polymer, especially, when the polymer is used in applications in the fields of electric and electronic technologies due to the possible decrease in the insulation of the circuit in a humid condition to cause errors in the operation of the circuit. Therefore, such a PPS polymer of high impurity content must be purified again before it is used.

SUMMARY OF THE INVENTION

It is therefore an object of the present invention to provide a novel and improved method for the preparation of a polyarylene sulfide or, in particular, PPS without using an expensive alkali metal salt of carboxylic acid as the catalyst so that the production cost of the polymer can remarkably be reduced.

Another object of the invention is to provide an industrially advantageous method for the preparation of a polyarylene sulfide or, in particular, PPS containing a much smaller amount of the impurity salt than in conventional polymers as a result of the outstanding ease in the separation of the polymer from the reaction mixture.

Thus, the method of the present invention for the preparation of a polyarylene sulfide comprises reacting an alkali metal sulfide and a polyhalogenated aromatic compound in a heterogeneous reaction mixture.

DETAILED DESCRIPTION OF THE PREFERRED EMBODIMENTS

One of the starting reactants used in the inventive method is an alkali metal sulfide represented by the general formula $M_2S$, in which M is an alkali metal such as sodium, potassium and lithium. Particularly preferable is sodium sulfide of the formula $Na_2S$.

The other starting reactant to be reacted with the alkali metal sulfide is a polyhalogenated aromatic compound which is a compound having at least 2 halogen atoms or, typically, chlorine and bromine atoms directly bonded to an aromatic nucleus from, for example, benzene or naphthalene represented by the general formulas

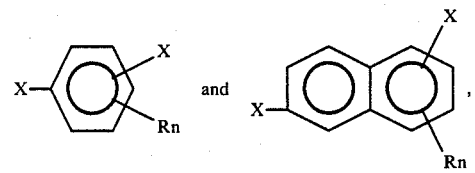

respectively, in which X is a halogen atom, R is a halogen atom or an alkyl group having from 1 to 20 carbon atoms and n is zero or a positive integer of 1 to 4. Examples of such a polyhalogenated aromatic compound include 1,2-dichlorobenzene, 1,3-dichlorobenzene, 1,4-dichlorobenzene, trichlorobenzenes, tetrachlorobenzenes, dibromobenzenes, tribromobenzenes, dichloronaphthalenes, trichloronaphthalenes, dichlorodiphenyl sulfones, dichlorobenzophenones, dichlorodiphenyl ethers, dichlorodiphenyl sulfide and the like. Two kinds or more of these compounds may be used as a mixture according to need.

The reaction of the above described alkali metal sulfide and polyhalogenated aromatic compound should be performed in a heterogeneous reaction mixture or, preferably, in a two-phase mixture. A typical and preferable example of such a reaction in a heterogeneous reaction mixture is the reaction of the above described starting reactants in the presence of water and polyethyleneglycol. In this case, the polyethyleneglycol should have an average molecular weight in the range from 2000 to 20,000 or, preferably, from 4000 to 15000 or, more preferably, from 6000 to 10,000. Polyethyleneglycols having an average molecular weight in this range are not freely miscible with water at elevated temperature so that a mixture thereof with water is separated into two phases while a polyethyleneglycol having an average molecular weight smaller than 2000 is miscible with water at all temperatures to form a homogeneous solution. Polyethyleneglycols having an excessively large average molecular weight are undesirable usually because such a polyethyleneglycol is so viscous that difficulties are encountered in handling thereof and process control of the reaction. This is the reason for the upper limit of 20,000 for the average molecular weight of the polyethyleneglycol used in the inventive method. The weight proportion of water to polyethyleneglycol in the reaction mixture should be in the range from 25:1 to 1:10 or, preferably, from 15:1 to 1:3 or, more preferably, from 10:1 to 1:1. When the amount of water in the reaction mixture is larger than 25 parts by weight per part by weight of polyethyleneglycol, the productivity of the desired polymer is decreased while a blend of water and polyethyleneglycol in which the amount of water is smaller than one tenth by weight of the polyethyleneglycol is not separated into two phases but forms a homogeneous solution.

The above-noted average molecular weights are number average molecular weights. The molecular weight measurement was obtained by gel permeation chromatography using benzene as a solvent at 30°C.

In practicing the method of the invention, a polyethyleneglycol having a low average molecular weight added to the reaction mixture may serve as an interphase transition catalyst. The polyethyleneglycol to exhibit such a catalytic activity should have an average molecular weight in the range from 100 to 1500 or, preferably, from 100 to 1000 or, more preferably, from 100 to 600. Also, as the molecular weight of the polyethyleneglycol decreases, the catalytic activity increases. When the average molecular weight thereof is larger than 1500, the polyethyleneglycol has a decreased solubility in water so that a lower catalytic activity is exhibited thereof as a result of the decrease in the interphase transition. The amount of the low-molecular polyethyleneglycol to serve as a catalyst should be 300 g or smaller or, preferably, in the range from 10 to 150 g per mole of the polyhalogenated aromatic compound.

In addition to the above mentioned low-molecular polyethyleneglycol, several inorganic and organic basic compounds may serve as a catalyst for the reaction of the inventive method including alkali metal hydroxides such as sodium and potassium hydroxides, alkali metal carbonates such as lithium, sodium and potassium carbonates and amides and related compounds such as N-methylpyrrolidone, N,N-dimethyl formamide, N-methyl caprolactam, tetramethylurea, 1,3-dimethyl-2-imidazolidine and the like.

The reaction of the alkali metal sulfide and the polyhalogenated aromatic compound according to the inventive method should be performed at a temperature in the range from 200 to 350°C. or, preferably, from 240 to 330°C. and the reaction is continued usually for 5 hours or longer or, preferably, for a length of time from 6 to 80 hours. To obtain good color product polyarylene sulfide, it is preferable to deaerate the reactor and water before dissolving the alkali metal sulfide at the start of reactor charging.

The reaction of the alkali metal sulfide and the polyhalogenated aromatic compound performed in the above described manner leads to the formation of the desired polyarylene sulfide or, typically, PPS. When the reaction mixture after completion of the reaction is kept at a temperature greater than 150°C., phase separation is maintained, consisting of an aqueous phase and a phase of the polyethyleneglycol containing powdery precipitates of the polyarylene sulfide of high molecular weight. In this case, water-soluble byproducts such as sodium chloride are dissolved and contained in the aqueous phase so that the content of the salt impurities in the polyarylene sulfide product is greatly decreased. The powdery precipitates of the high-molecular polyarylene sulfide contained in the phase of the polyethyleneglycol are collected by filtration and freed from the polyethyleneglycol by washing with water or an organic solvent such as methylene chloride, acetone and the like. The filtrate of the polyethyleneglycol phase is a mixture of the polyethyleneglycol and polyarylene sulfide of a relatively low molecular weight. The high-molecular polyarylene sulfide is further purified to be freed from impurities such as the unreacted starting reactants by washing with water, acetone and the like.

As is described above, the present invention provides a method for the preparation of a polyarylene sulfide or, typically, PPS with outstandingly low production costs because the reaction of the inventive method is performed without the use of an expensive alkali metal carboxylate indispensable in the prior art methods. Furthermore, the inventive method has an advantage that the polymer product can readily be separated from the reaction mixture because the reaction is performed in a heterogeneous reaction system comprising the specific two phases. In addition, the extremely low content of the salt impurities in the polymer product gives a possibility that the polymer product can be used for specific applications in the fields of electric and electronic technologies without disadvantages caused by the presence of salt impurities. Therefore, the polyarylene sulfide products such as PPS obtained by the method of the present invention are very useful as a class of engineering plastics.

In the following the method of the present invention is described in more detail by way of examples.

EXAMPLE 1

Into an autoclave of 2-liter capacity equipped with a stirrer were introduced with agitation an aqueous solution of 72.050 g (0.3 mole) of sodium sulfide nonahydrate ($Na_2S.9H_2O$) dissolved in 600 ml of distilled water, 200 g of a polyethyleneglycol having an average molecular weight of about 8000 and 44.103 g (0.3 mole) of 1,4-dichlorobenzene to form a reaction mixture, in which the weight ratio of water to the polyethyleneglycol was 3:1. Nitrogen gas was gently blown into this reaction mixture for about 30 minutes.

The reaction mixture was heated and stirred at about 80°C. to allow uniform mixing and the autoclave was closed under pressurization with nitrogen gas at a pressure slightly higher than the atmospheric. Under continuous agitation with the stirrer driven at 300 rpm, the temperature of the reaction mixture was increased to 275°C. while the pressure inside the autoclave increased to 430 psig to effect the reaction which was continued for about 20 hours at the same temperature. After completion of the reaction in this manner, agitation and heating of the reaction mixture were discontinued and the mixture was kept standing to be cooled to room temperature.

The aqueous solution of about 575 ml volume forming the upper layer in the autoclave was transferred into a jar by siphon and 100 ml of toluene were added thereto and blended by use of a roll mill. When the liquid mixture in the jar had been settled and separated into two phases, the organic upper layer of toluene was a clear reddish solution while the aqueous solution forming the lower layer was yellowish brown in color with turbidity. No solid precipitates were found on the bottom of the jar. The light yellowish brown product suspended in the aqueous solution was collected by filtration and washed twice with water and further twice with acetone to be freed from the unreacted sodium sulfide and 1,4-dichlorobenzene.

The polyethyleneglycol solution left in the autoclave was admixed with 500 ml of water and 100 ml of toluene and the mixture was agitated for 3 hours and then transferred into a jar of 1-gallon capacity by siphon from the autoclave. About 3.0 g of yellowish brown precipitates were found on the bottom of the autoclave and recovered. This material was a PPS of low molecular weight dissolved in the polyethyleneglycol.

When the liquid mixture in the jar had been stabilized and separated into two phases, the toluene solution forming the upper layer was clear and red in color while the lower layer was formed of a yellowish brown aqueous suspension containing black solid particles on the bottom. The toluene solution was separated by decantation and evaporated and the aqueous suspension was filtered by use of a medium-fast flow filter paper with suction by a water-jet aspirator. No particulate product was found in the aqueous phase.

The light yellowish brown solid product thus collected by evaporation of the toluene was washed first with water and then with acetone and combined with the solid material recovered from the bottom of the autoclave followed by drying for 16 hours under reduced pressure. The overall yield of the thus obtained PPS was 0.28 g. The infrared absorption spectrum of this product was identical with that of an authentic poly(1,4-phenylene sulfide). The product was washed with hot water and analyzed by the atomic absorption spectrometry for the content of chloride impurities to find a content of 10 ppm while the value in the same PPS before washing with hot water was 400 ppm.

EXAMPLE 2

The experimental procedure was substantially the same as in the preceding example excepting the following modifications. In this case, the amounts of the sodium sulfide and 1,4-dichlorobenzene were each 0.5 mole and the weight proportion of water to polyethyleneglycol as the reaction medium was 1:1. The reaction temperature was 300°C. instead of 275°C. The product was found to be suspended in one phase indicating the importance of the weight proportion of water to polyethyleneglycol in the reaction medium. The overall yield of the product was 1.41 g and the product was identified to be a PPS by the infrared absorption spectroscopy. The balance of the product was in an emulsified state in the phase of water and polyethyleneglycol.

EXAMPLE 3

The experimental procedure was also substantially the same as in Example 1 except that the polyethyleneglycol used here was a mixture of 100 g of a first polyethyleneglycol having an average molecular weight of about 8000 and 10 g of a second polyethylene glycol having an average molecular weight of about 400 with the weight proportion of water to polyethyleneglycol equal to 6:1 and the conduit pipe to the pressure gauge was closed to prevent sublimation of 1,4-dichlorobenzene.

Thus, an aqueous solution of 72.054 g of sodium sulfide $Na_2S.9H_2O$ dissolved in 600 ml of water, 44.103 g of 1,4-dichlorobenzene, 100 g of a first polyethyleneglycol having an average molecular weight of about 8000 and 10 g of a second polyethyleneglycol having an average molecular weight of about 400 were introduced together into a reaction vessel to form a reaction mixture which was homogenized by heating at about 80°C. under agitation with simultaneous blowing of nitrogen gas thereinto.

Thereafter, the reaction vessel was hermetically closed and the temperature of the reaction mixture was increased to 275°C. to effect the reaction at the same temperature for 24 hours. After the end of this reaction time, a small portion of the reaction mixture was taken out of the vessel and diluted with acetone to be analyzed by the gas chromatography which indicated the presence of unreacted dichlorobenzene in the reaction mixture.

The reaction mixture was allowed to cool with the rotation of the stirrer discontinued and the thin aqueous solution of 625 ml in volume forming the upper layer of the reaction mixture separated into two layers was discharged out of the reaction vessel by suction through the opening provided on the wall of the vessel. The remaining mixture in the vessel, which was mainly composed of the polyethyleneglycol and yellowish brown precipitates of PPS suspended therein as the product, was admixed and agitated with 150 ml of methylene chloride and the mixture was extracted repeatedly with water followed by evaporation of the solvent to leave 3.01 g of a brown solid as the product. The theoretical yield of the product in this case was 32.4 g.

EXAMPLES 4 to 6

The experimental procedure in each of the Examples was substantially the same as in Example 3 excepting the modification of the reaction conditions as indicated in the table given below which also includes the results obtained in each of the Examples.

EXAMPLE 7

Into a 2-liter stirred autoclave was charged, 675 ml of a 360 mg/ml $Na_2S.9H_2O$ solution (1.01 mole, determined by iodimetric assay) with 147.01 g of p-dichlorobenzene (1.00 mole). Also added were 200 g of a polyethylene glycol with a molecular weight of 8000, 50 g of a polyethylene glycol (PEG) with a molecular weight of 400, and 10 g of potassium hydroxide.

The mixture was melted by heating to approximately 80°C., the autoclave sealed off under slight nitrogen pressure, and the ingredients stirred at 300 rpm. After 42 hours at 275°C., the stirrer and heater were turned off, and the reaction mixture was allowed to cool to room temperature, vented, and opened.

A two phase system had been established and 675 ml of the top aqueous phase was siphoned from the reactor and filtered. There was no PPS present in the top layer.

To the sediment remaining in the reactor was added 200 ml methylene chloride, and hand stirred for approximately three minutes. After the mixture was siphoned from the reactor, it was filtered using a water aspirator vacuum, and a medium-fast flow filter paper. The product was extracted repeatedly with distilled water and acetone, and vacuumed dried to obtain 26.59 g of a tan-brown solid, which was determined to be PPS by IR analysis.

The filtrate from this filtration procedure was extracted with 800 ml of a 10% hydrogen chloride solution in a separatory funnel. The acid solution was then decanted off, and the methylene chloride layer washed until neutral with distilled water.

The neutral methylene chloride phase was then transferred into a 500 ml 1-neck boiling flask, and by rotary evaporation, 76.52 g of a dark brown, waxy solid was obtained. IR analysis of this waxy solid revealed a mixture of PPS and PEG.

The theoretical yield from this experiment was 108.1 g. The actual yields were 26.59 g PPS or 24.6%, and 76.52 g of the PPS-PEG mixture or 70.8%. Thus the total yield was 95.4 percent. Since the molar extinction coefficient (infrared absorption intensity) of PEG is one-hundred times greater than that of PPS, the weak absorption due to PEG is attributed to a very small percentage of PEG. Thus, the 76.52, of the mixture is mostly PPS.

polyethyleneglycol is from 10:1 to 1:3 and the reaction temperature is from 240° to 330° C.

TABLE

| Example No. | Molar ratio of Na$_2$S/dichlorobenzene | Weight ratio of H$_2$O/high molecular PEG | Catalysts (g) | Reaction temperature, °C. | Reaction time, hours | Yield of PPS Insoluble[a] g | Yield of PPS Soluble[b] g | % of theoretical | Residual content of NaCl, ppm |
|---|---|---|---|---|---|---|---|---|---|
| 1 | 0.3/0.3 | 600/200 | — | 275 | 20 | 0.28 | 3.0 | 10.3 | 400 |
| 2 | 0.5/0.5 | 600/600 | — | 300 | 24 | 1.41 | 5.0 | 11.9 | — |
| 3 | 0.3/0.3 | 600/100 | Low molecular PEG (10) | 275 | 24 | 3.01 | 16.0 | 59.3 | 310 |
| 4 | 1/1 | 795/200 | Low molecular PEG (10) | 275 | 24 | 24.46 | 37.54 | 57.4 | — |
| 5 | 1/1 | 675/200 | Low molecular PEG (50) | 275 | 24 | 35.33 | 32.3[c] | 44.5 | — |
| 6 | 1.3/1 | 830/200 | Low molecular PEG (50) | 275 | 24 | 7.80 | 25.67[c] | 30.9 | — |
| 7 | 1/1 | 675/200 | Low molecular PEG (50) + KOH (10) | 275 | 42 | 26.59 | 76.52[c] | 95.4 | — |

[a]insoluble in methylene chloride
[b]soluble in methylene chloride
[c]extracted with dilute HCl

What is claimed is:

1. A method for the preparation of a polyarylene sulfide comprising reacting an alkali metal sulfide with a polyhalogenated aromatic compound in a heterogeneous reaction mixture comprising water and polyethyleneglycol having a number average molecular weight of from 2,000 to 20,000 the weight ratio of the water to said polyethyleneglycol being from 25:1 to 1:10, to form said polyarylene sulfide and to form an alkali metal halide salt and recovering said polyarylene sulfide from said reaction mixture.

2. The method of claim 1 wherein the reaction is carried out at a temperature of from 200° to 350° C.

3. The method of claim 2 wherein said average molecular weight is from 4,000 to 15,000 and wherein said weight ratio is from 15:1 to 1:3.

4. The method of claim 1 wherein said average molecular weight is from 6,000 to 10,000 and wherein said weight ratio is from 10:1 to 1:1.

5. The method of claim 4 wherein the reaction is carried out at a temperature of from 240° to 330° C.

6. The method of claim 1 wherein said polyethyleneglycol is a mixture of a first polyethyleneglycol having an average molecular weight of from 2,000 to 20,000 and a second polyethyleneglycol having an average molecular weight of from 100 to 1,500.

7. The method of claim 6 wherein said second polyethyleneglycol has an average molecular weight of from 100 to 1,000 the weight ratio of the water to the total polyethyleneglycol is from 25:1 to 1:10, and the reaction temperature is from 200° to 350° C.

8. The method of claim 7 wherein said second polyethyleneglycol has an average molecular weight of from 100 to 600, the weight ratio of the water to the total polyethyleneglycol is from 10:1 to 1:3 and the reaction temperature is from 240° to 330° C.

9. The method of claim 1 wherein said polyarylene sulfide is polyphenylene sulfide and said polyhalogenated aromatic compound is 1,4-dichlorobenzene.

10. The method of claim 2 wherein said polyarylene sulfide is polyphenylene sulfide and said polyhalogenated aromatic compound is 1,4-dichlorobenzene.

11. The method of claim 6 wherein said polyarylene sulfide is polyphenylene sulfide and said polyhalogenated aromatic compound is 1,4-dichlorobenzene.

12. The method of claim 3 wherein said polyarylene sulfide is polyphenylene sulfide, said polyhalogenated aromatic compound is 1,4-dichlorobenzene and said alkali metal sulfide is sodium sulfide.

13. The method of claim 5 wherein said polyarylene sulfide is polyphenylene sulfide, said polyhalogenated aromatic compound is 1,4-dichlorobenzene and said alkali metal sulfide is sodium sulfide.

14. The method of claim 7 wherein said polyarylene sulfide is polyphenylene sulfide, said polyhalogenated aromatic compound is 1,4-dichlorobenzene and said alkali metal sulfide is sodium sulfide.

15. The method of claim 8 wherein said polyarylene sulfide is polyphenylene sulfide, said polyhalogenated aromatic compound is 1,4-dichlorobenzene and said alkali metal sulfide is sodium sulfide.

16. The method of claim 6 wherein said second polyethyleneglycol is in an amount not more than 300 g per mole of the polyhalogenated aromatic compound.

17. The method of claim 7 wherein said second polyethyleneglycol is in an amount from 10 to 150 g per mole of the polyhalogenated aromatic compound.

18. The method of claim 15 wherein said second polyethyleneglycol is in an amount from 10 to 150 g per mole of the polyhalogenated aromatic compound.

* * * * *